US012679457B2

(12) United States Patent
Record

(10) Patent No.: US 12,679,457 B2
(45) Date of Patent: Jul. 14, 2026

(54) EXCAVATOR ROTATING ASSEMBLY

(71) Applicant: Kable Darren Record, Glendale, AZ (US)

(72) Inventor: Kable Darren Record, Glendale, AZ (US)

( * ) Notice: Subject to any disclaimer, the term of this patent is extended or adjusted under 35 U.S.C. 154(b) by 346 days.

(21) Appl. No.: 18/594,097

(22) Filed: Mar. 4, 2024

(65) Prior Publication Data

US 2025/0153770 A1     May 15, 2025

Related U.S. Application Data

(60) Provisional application No. 63/598,078, filed on Nov. 11, 2023.

(51) Int. Cl.
B62D 11/00 (2006.01)
B60S 9/205 (2006.01)
(52) U.S. Cl.
CPC .............. B62D 11/00 (2013.01); B60S 9/205 (2013.01)
(58) Field of Classification Search
CPC ........... E02F 9/085; B62D 11/00; B60S 9/205
See application file for complete search history.

(56) References Cited

U.S. PATENT DOCUMENTS

| | | | | | |
|---|---|---|---|---|---|
| 1,953,442 | A | * | 4/1934 | Sorescu ................. | B60S 9/205 |
| | | | | | 254/421 |
| 3,239,019 | A | * | 3/1966 | Ida .......................... | B60S 9/205 |
| | | | | | 280/43.23 |
| 4,391,477 | A | * | 7/1983 | Morrow, Sr. ........... | B66C 23/84 |
| | | | | | 384/592 |
| 4,401,408 | A | * | 8/1983 | Gibert ...................... | E02F 3/30 |
| | | | | | 180/8.5 |
| 4,622,860 | A | * | 11/1986 | Cametti .................. | F16C 19/30 |
| | | | | | 384/593 |
| 4,938,305 | A | * | 7/1990 | Park ......................... | B60S 9/215 |
| | | | | | 180/199 |
| 5,490,758 | A | * | 2/1996 | Stone ........................ | B66F 7/08 |
| | | | | | 414/495 |
| 6,266,901 | B1 | * | 7/2001 | Kanda ..................... | B66F 9/065 |
| | | | | | 37/403 |

* cited by examiner

*Primary Examiner* — Seahee Hong
(74) *Attorney, Agent, or Firm* — Bruce A. Lev

(57) ABSTRACT

An apparatus and method for lifting and rotating excavator tracks above a ground surface. The apparatus includes a hydraulic lifting apparatus that is attached to the underside of the excavator main frame and is adapted to be extended to contact the ground surface, push and lift the excavator main frame and tracks off the ground surface, and allow rotation of the tracks with respect to the ground surface.

11 Claims, 6 Drawing Sheets

EXCAVATOR ROTATING ASSEMBLY

CROSS-REFERENCE TO RELATED APPLICATION

The present application is related to and claims priority from prior provisional application Ser. No. 63/598,078, filed Nov. 11, 2023 which is incorporated herein by reference.

COPYRIGHT NOTICE

BACKGROUND OF THE INVENTION

1. Field of the Invention

This invention relates generally to rotating assemblies for vehicles, and more specifically to a rotating assembly for an excavator.

2. Description of the Related Art

Excavator tread/track wear is inherent in excavator designs. Turning like a tank forces the tracks to slide across the ground disturbing the soil significantly and causing great strain on the machine. Tracks are expensive and difficult to replace. Lifting one end of the tracks up off the ground and then turning aids in reducing wear but does not eliminate it. This also does not keep whatever surface the machine is on from being damaged.

Accordingly, the present invention overcomes the disadvantages associated with the prior art, by providing an apparatus and method for lifting and rotating excavator tracks above a ground surface that includes a hydraulic lifting apparatus that is attached to the underside of the excavator main frame and is adapted to be extended to contact the ground surface, push and lift the excavator main frame and tracks off the ground surface, and allow rotation of the excavator with respect to the ground surface.

BRIEF SUMMARY OF THE INVENTION

In view of the foregoing disadvantages inherent in the known types of excavators, the present invention provides an apparatus and method for lifting and rotating excavator tracks above a ground surface that includes a hydraulic lifting apparatus that is attached to the underside of the excavator main frame and is adapted to be extended to contact the ground surface, push and lift the excavator main frame and tracks off the ground surface, and allow rotation of the excavator with respect to the ground surface with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1A:
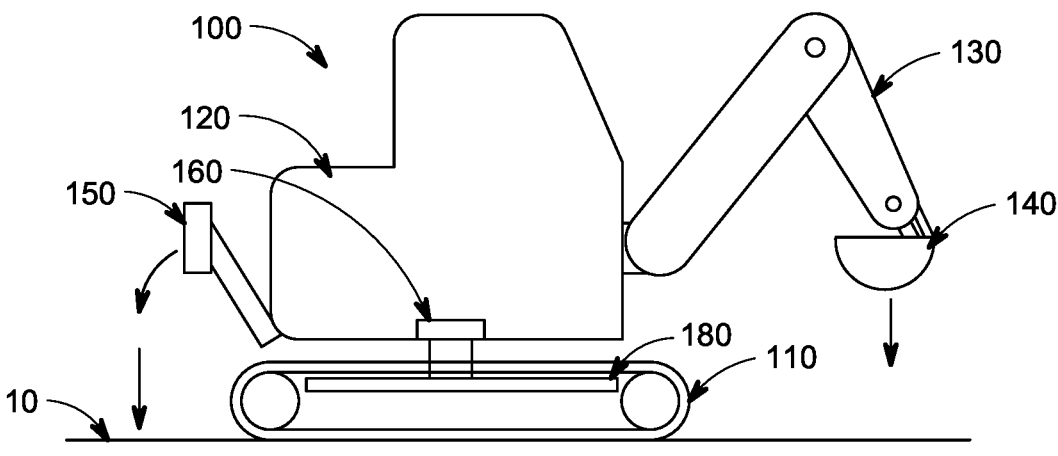
FIG. 1a and FIG. 1b show the prior art method for lifting and rotating excavator tracks above a ground surface.
Figure 1B:
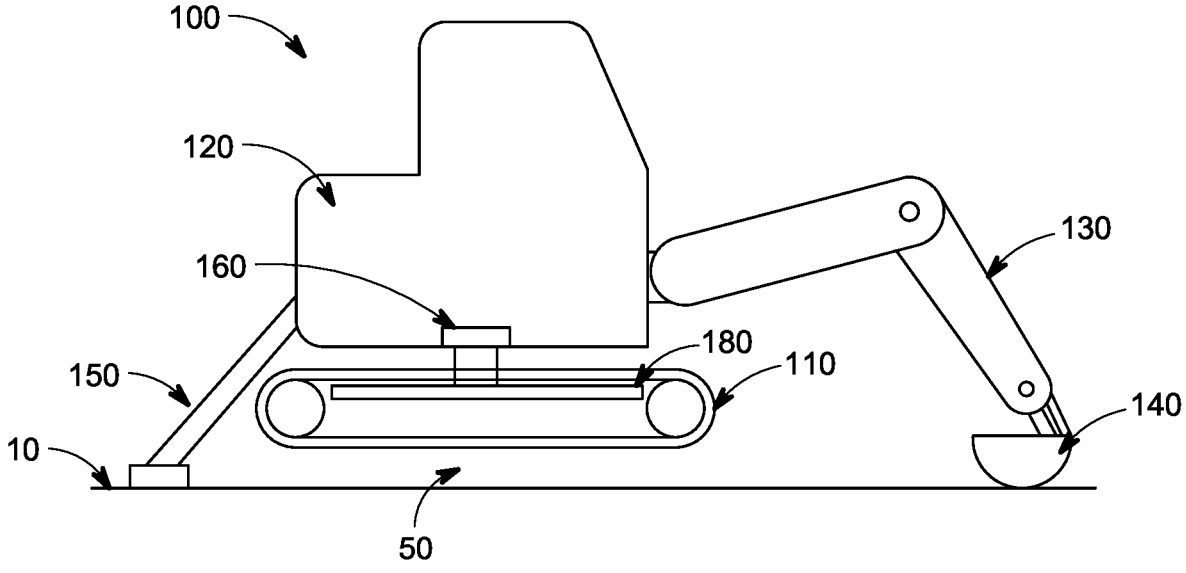

Prior art excavators 100, illustrated in FIGS. 1a and 1b, usually include a cabin 120, a boom 130 connected to the cabin at a proximal end thereof, a bucket 140 connected to the boom at a distal end thereof, a main frame including an underside and rotatably connected to a lower portion of the cabin, a pair of tracks 110 movably attached to the main frame, a pivotable foot 150, and a rotary motor 160 connected between the cabin and the main frame adapted to rotate the main frame with respect to the cabin. In use, the bucket 140 and the pivotable foot 150 are lowered to the ground 10, then further pushed toward the ground lifting the main frame and the tracks off the ground, thereby creating a space 50 between the tracks and the ground. This keeps the upper parts of the excavator, including the cabin, from spinning, allowing the tracks to spin underneath it instead. To rotate the tracks, the operator uses its main left and right directional controls typically found on its left joystick within or adjacent the excavator cabin. Once the tracks are re-orientated in the direction preferred by the operator, the bucket 140 and the pivotable foot 150 are retracted and travel can resume until another turn is needed.

Referring to the preferred embodiment illustrated in FIGS. 2-5, the present invention discloses the use of an apparatus 200 for lifting and rotating tracks 110 of an excavator 100 above a ground surface 10.

An excavator 100 that the invention is prominently used upon, as also illustrated in FIG. 1, includes a cabin 120, a boom 130 connected to the cabin at a proximal end thereof, a bucket 140 connected to the boom at a distal end thereof, a main frame 180 including an underside and rotatably connected to a lower portion of the cabin, a pair of tracks 110 movably attached to the main frame 180, a pivotable foot 150, and a rotary motor 160 connected between the cabin and the main frame 180 and is adapted to rotate the main frame with respect to the cabin.

The apparatus 200 of the instant invention for lifting and rotating the excavator tracks 110 of the excavator 100 includes a frame attachment plate 210 adapted to be securely attached to the underside of the main frame 180 of the excavator 100; a lifting mechanism 220 attached to the frame attachment plate 210; and a turntable assembly 230 attached to the lifting mechanism 220 opposite from the frame attachment plate 210, wherein the turntable assembly 230 is adapted to engage the ground surface 10 and allow rotation of the frame attachment plate and the lifting mechanism with respect thereto, wherein the lifting mechanism 220 is adapted to move the turntable assembly 230 downwards and upwards with respect to the frame attachment plate 210.

When in use, the boom 130 of said excavator 100 is lowered such that the bucket 140 engages the ground surface 10, then the turntable assembly 230 is moved downwards and contacts the ground surface and pushes the frame attachment plate 210 upwards from the ground surface, that raises the excavator main frame 180 and the pair of tracks 110 above the ground surface, then when the excavator main frame 180 and the pair of tracks 110 are above the ground surface, and while the bucket 140 is engaged with the ground surface, the rotary motor 160 of the excavator is used to rotate the main frame 180 and the pair of tracks 110 and the frame attachment plate 210 and the lifting mechanism 220 via the turntable assembly 230 and relative to the ground surface to a desired position with respect to the ground surface; then when the turntable assembly 230 is moved upwards and disengages from the ground surface it allows the main frame 180, the pair of tracks 110, and the frame attachment plate 210 to move downwards toward the ground surface which lowers the excavator 100 and the pair of tracks 110 back upon the ground surface; then the boom 130 is raised and the bucket 140 disengaged from the ground surface such that the excavator is ready for use.

Figure 2:
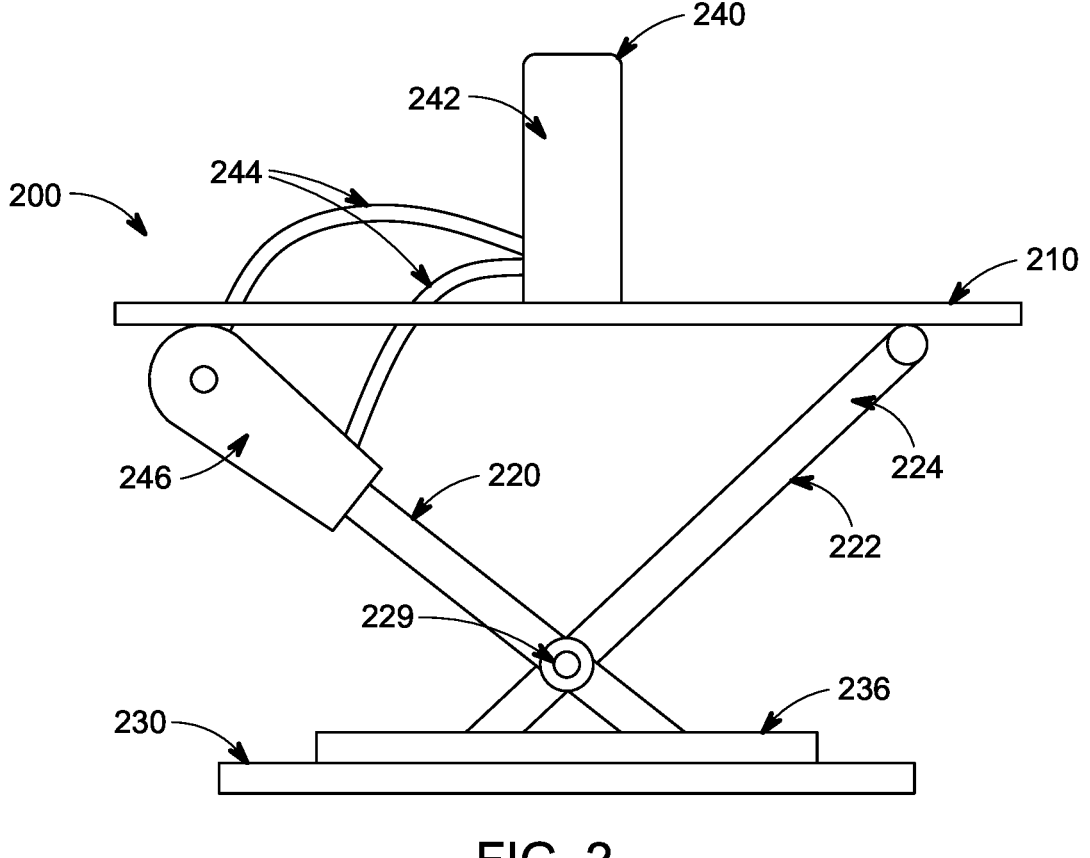
FIG. 2 shows a side view of the apparatus for lifting and rotating excavator tracks above a ground surface according to the preferred embodiment of the present invention.
Figure 3:
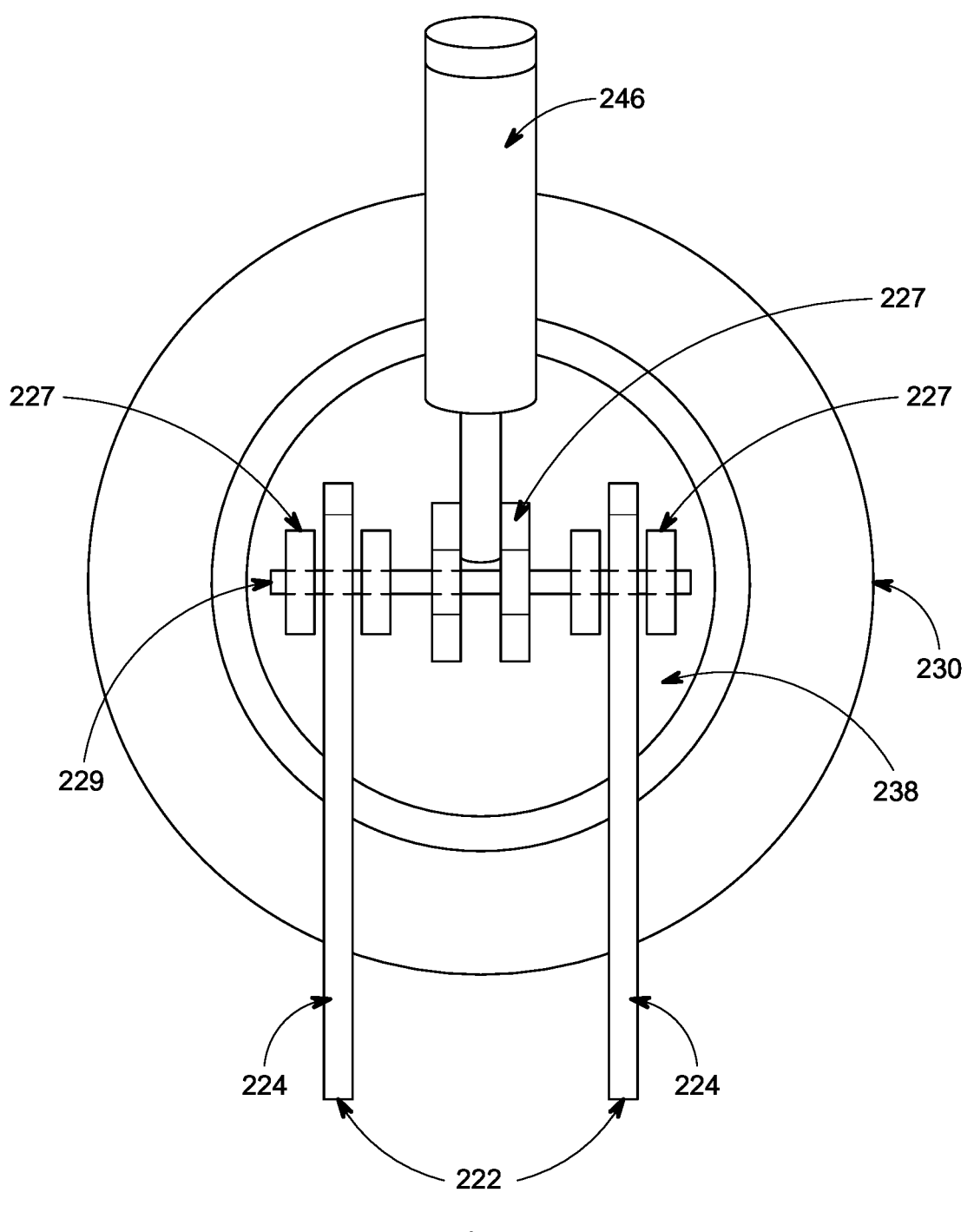
FIG. 3 shows a top view of the apparatus for lifting and rotating excavator tracks above a ground surface according to the preferred embodiment of the present invention shown in FIG. 2.

As best illustrated in FIGS. 2 and 3, the lifting mechanism 220 of the instant invention includes a linkage assembly 222 including two linkages 224 that are positioned parallel and spaced from one another and is pivotally connected to the frame attachment plate 210 and pivotally connected to the turntable assembly 230, a hydraulic assembly 240 including a hydraulic controller 242 adapted to be attached within or adjacent to the cabin 120 of the excavator 100, a hydraulic piston 246 pivotally connected to the frame attachment plate 210 and pivotally connected to the turntable assembly 230; and two hydraulic hoses 244 respectively connected between the hydraulic controller and the hydraulic piston, wherein the hydraulic assembly is used to move the turntable assembly downwards and upwards.

Figure 4:
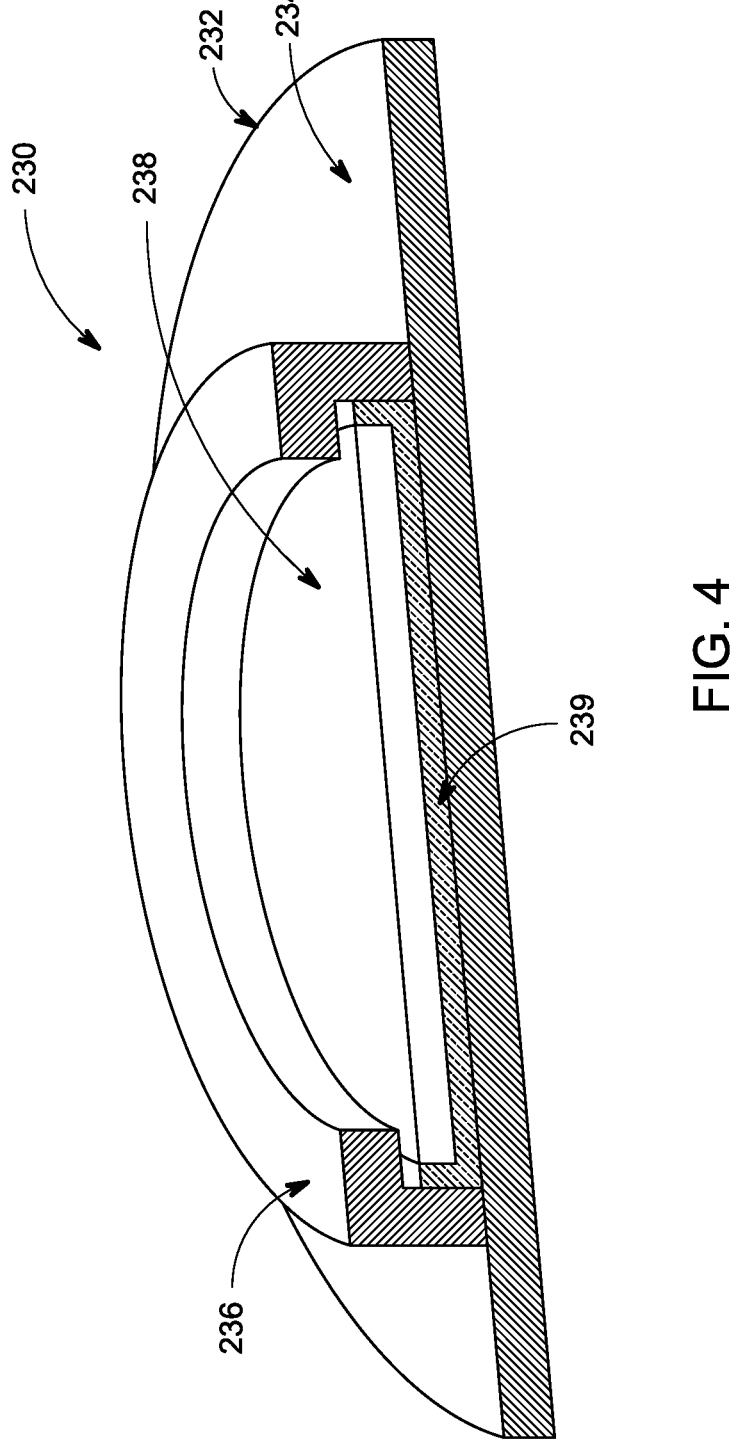
FIG. 4 shows a perspective cut-away view of the turntable assembly of the apparatus for lifting and rotating excavator tracks above a ground surface in a non-use configuration according to the preferred embodiment of the present invention of FIG. 2.
Figure 5:
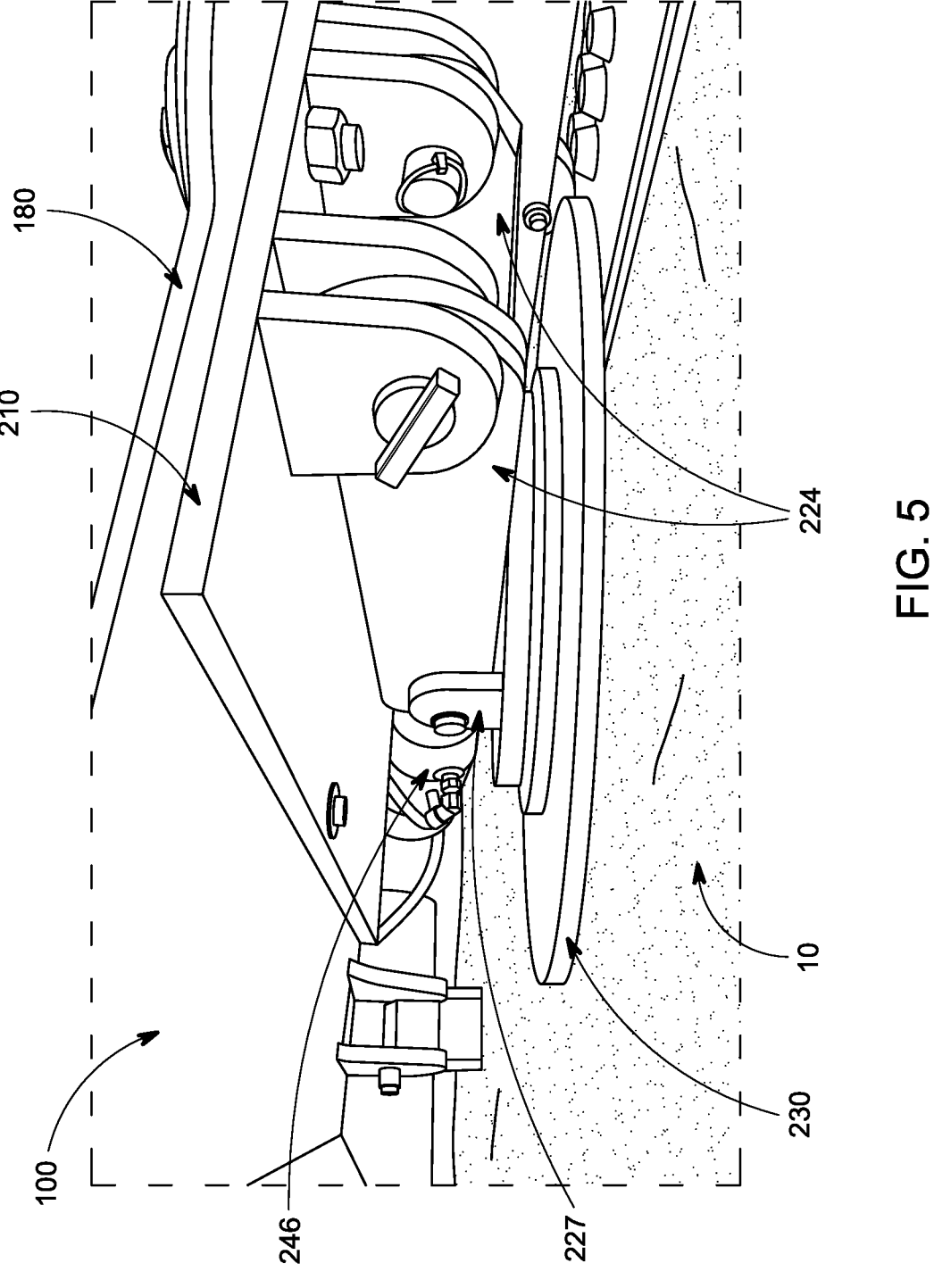
FIG. 5 shows a perspective view of the apparatus for lifting and rotating excavator tracks above a ground surface in a stored configuration according to the preferred embodiment of the present invention of FIG. 2.

As best illustrated in FIGS. 4, the turntable assembly 230 of the instant invention includes a base plate 232 including a bottom plate portion 234; an encapsulating ring 236, typically formed having an L-shaped cross-section, that is attached to a top surface of the bottom plate portion; and a circular plate 238 sized and shaped and adapted to be held by said encapsulating ring between said bottom plate portion and said encapsulating ring, such that said circular plate can rotate freely therebetween; and wherein the hydraulic piston 246 is attached to the circular plate 238 of the turntable assembly, and linkages 224 are also attached to the circular plate 238 of the turntable assembly. The turntable assembly 230 may further comprise a lubricant 239 between the bottom plate portion and the circular plate.

Figure 6:
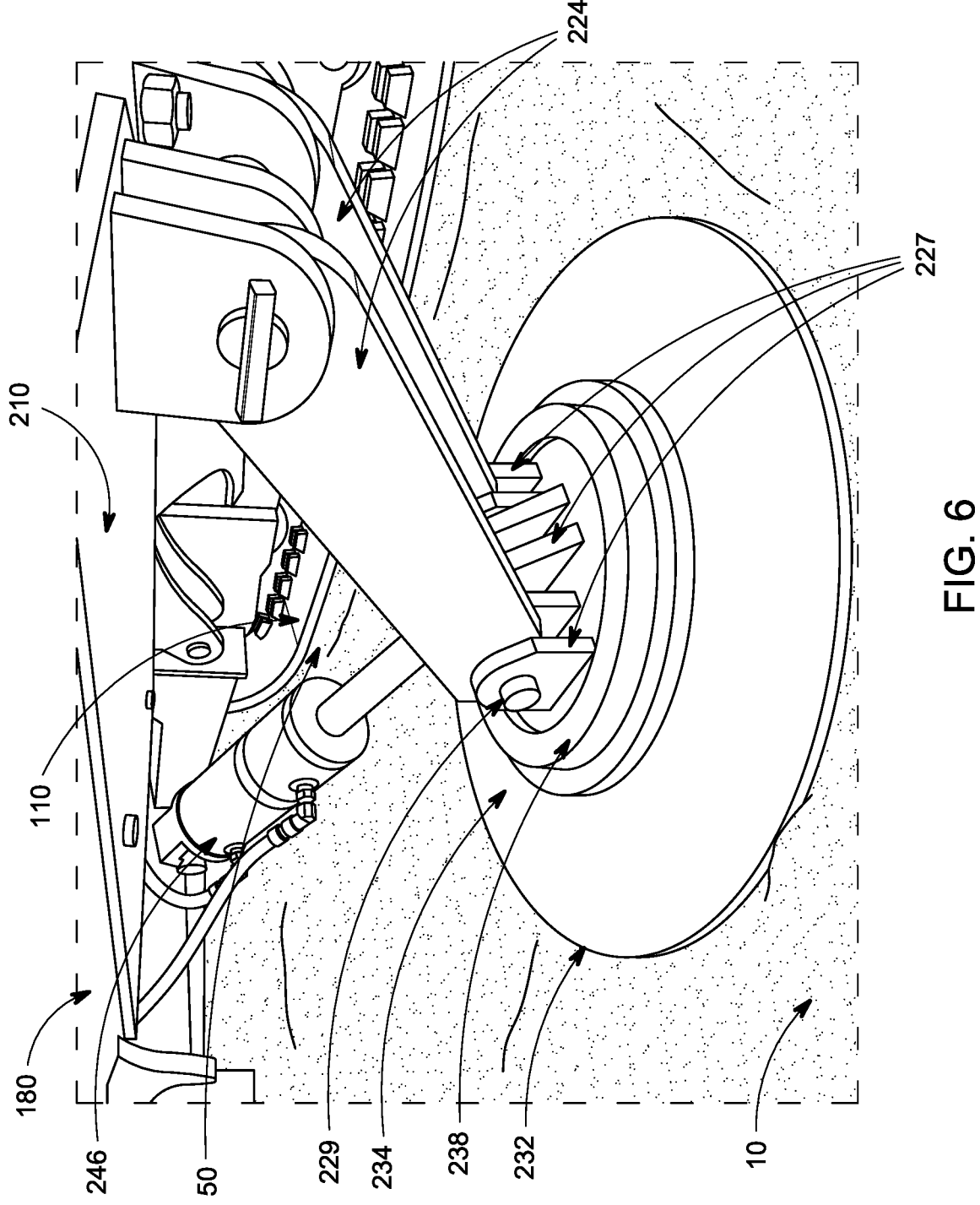
FIG. 6 shows a perspective view of the apparatus for lifting and rotating excavator tracks above a ground surface in an in-use configuration according to the preferred embodiment of the present invention of FIG. 2.

As best shown in FIGS. 2, 3, and 6, the attachment between the hydraulic piston 246 and said circular plate 238 is located in between the attachments of two linkages 224 to the circular plate 238, and wherein the attachment of the hydraulic piston 246 to the frame attachment plate 210 is spaced from the attachments of the two linkages 224 to the frame attachment plate 210, such that the apparatus for lifting and rotating the excavator is adapted to more stably lift and rotate the excavator above the ground surface. Furthermore, a stabilizing pivot foot 227 is used to pivotally attach the hydraulic piston 246 to the circular plate 238 of the turntable assembly, and wherein two stabilizing pivot feet 227 are used to respectively pivotally attach the two linkages 224 to the circular plate 238 of the turntable assembly, and wherein the stabilizer pivot foot 227 of the hydraulic piston is located in between and linearly aligned with the stabilizing pivot feet 227 of the two linkages 224, and wherein an elongated pivot pin 229 is placed simultaneously through the stabilizing pivot feet 227 of the two linkages, the two linkages 224, the stabilizer pivot foot 227 of the hydraulic piston, and the hydraulic piston 246, and is adapted and used to increase the stability of the apparatus 200 for lifting and rotating the excavator 100 when in use.

As previously discussed, when in use the operator of the excavator 100 must put the excavator bucket 140 on the ground and then extend the lifting mechanism 220 to lift the excavator tracks 110 off of the ground. It does not matter on which side one places the bucket. This stabilizes the excavator and keeps it in a fixed position and keeps the upper parts of the excavator, including the cabin, from spinning, allowing the tracks to spin underneath it instead. To rotate the tracks, the operator uses the main left and right directional controls typically found in the left joystick within an excavator cabin. Once the tracks are re-orientated in the direction preferred by the operator, the attachment is retracted and the bucket lifted off of the ground. Travel can resume until another turn is needed, repeating the steps just described.

The apparatus 200 for lifting and rotating the excavator above the ground surface allows the turntable assembly 230 of the apparatus to stay parallel to the ground as it is extended or retracted. Having the turntable assembly pivot allows it to retract upwards further than if it was at a fixed angle. Furthermore, at the end of the hydraulic piston 246 there can be a point/nub/extension adapted to make contact with the turntable assembly 230 when it is fully extended to stabilize the excavator on the turntable assembly to avoid tipping forwards or backwards. As such, combining the point/nub/extension with the two linkages 224, it will be stable on all four sides.

An alternate embodiment of the lifting mechanism is to incorporate two spaced hydraulic cylinders 246 in a vertical orientation. This would allow the turntable assembly to stay in a parallel plane as it moves up and down. The hydraulic cylinders could be placed inside the cabin of the excavator and be attached to the turntable assembly and extend vertically downward until the excavator is lifted off the ground.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. An apparatus for lifting and rotating excavator tracks above a ground surface, comprising:
   a frame attachment plate;
      wherein said frame attachment plate is adapted to be securely attached to an underside of a main frame of an excavator;
   a lifting mechanism comprising:
      a linkage assembly including:
         two linkages;
            wherein said two linkages are parallel and spaced from one another;
         wherein said linkage assembly is pivotally connected to said frame attachment plate and pivotally connected to said turntable assembly; and
      a hydraulic assembly including:
         a hydraulic controller;
            wherein said hydraulic controller is adapted to be attached to said excavator and above said frame attachment plate;
         a hydraulic piston;
            wherein said hydraulic piston is pivotally connected to said frame attachment plate and pivotally connected to said turntable assembly; and
         two hydraulic hoses;
            wherein said two hydraulic hoses are respectively connected between said hydraulic controller and said hydraulic piston;
         wherein said hydraulic assembly is used to move said turntable assembly downwards and upwards;
      wherein said lifting mechanism is attached to said frame attachment plate; and
   a turntable assembly;

6 wherein said turntable assembly is attached to said lifting mechanism opposite from said frame attachment plate;
   wherein said turntable assembly is adapted to engage said ground surface and allow rotation of said frame attachment plate and said lifting mechanism with respect thereto;
   wherein said lifting mechanism is adapted to move said turntable assembly downwards and upwards with respect to said frame attachment plate; and
   wherein when said turntable assembly is moved downwards and contacts said ground surface said frame attachment plate is adapted to be pushed upwards from said ground surface and raise said excavator above said ground surface;
   wherein when said excavator is above said ground surface, said excavator is capable of rotating the main frame of the excavator and thereby said frame attachment plate and said lifting mechanism with respect to said turntable assembly to a desired position;
   and wherein when said turntable assembly is moved upwards and disengages from said ground surface said frame attachment plate is adapted to be allowed to move downwards toward said ground surface and to lower said excavator back upon said ground surface.

2. The apparatus of claim 1, wherein said turntable assembly comprises:
   a base plate including:
      a bottom plate portion; and
      an encapsulating ring;
         wherein said encapsulating ring is attached to a top surface of said bottom plate portion; and
   a circular plate;
      wherein said circular plate is sized and shaped and adapted to be held by said encapsulating ring between said bottom plate portion and said encapsulating ring, such that said circular plate can rotate freely therebetween; and
   wherein said hydraulic piston is attached to said circular plate of said turntable assembly, and said two linkages are attached to said circular plate of said turntable assembly.

3. The apparatus of claim 2, wherein said turntable assembly further comprises a lubricant between said bottom plate portion and said circular plate.

4. The apparatus of claim 2, wherein said attachment between said hydraulic piston and said circular plate is between said attachment of said two linkages to said circular plate; and wherein said attachment of said hydraulic piston to said frame attachment plate is spaced from said attachment of said two linkages to said frame attachment plate, such that said apparatus for lifting and rotating said excavator is adapted to stabily lift and rotate said excavator above said ground surface.

5. The apparatus of claim 4, wherein a stabilizing pivot foot is used to pivotally attach said hydraulic piston to said circular plate of said turntable assembly; wherein two stabilizing pivot feet are used to respectively pivotally attach said two linkages to said circular plate of said turntable assembly; wherein said stabilizer pivot foot of said hydraulic piston is between and linearly aligned with said stabilizing pivot feet of said two linkages; and wherein an elongated pivot pin is placed simultaneously through said stabilizing pivot feet of said two linkages, said two linkages, said stabilizer pivot foot of said hydraulic piston, and said hydraulic piston, and is adapted and used to increase the stability of said apparatus for lifting and rotating said excavator while in use.

6. A combination of an excavator and an apparatus for lifting and rotating tracks of said excavator above a ground surface, comprising:
   said excavator including:
      a cabin;
      a boom;
         wherein said boom is connected to said cabin at a proximal end thereof;
      a bucket;
         wherein said bucket is connected to said boom at a distal end thereof;
      a main frame including:
an underside;
         wherein said main frame is rotatably connected to a lower portion of said cabin;
      a pair of tracks;
         wherein said pair of tracks are movably attached to said main frame; and
      a rotary motor;
         wherein said rotary motor is connected between said cabin and said main frame and is adapted to rotate said main frame with respect to said cabin; and said apparatus for lifting and rotating said excavator tracks:
      a frame attachment plate;
         wherein said frame attachment plate is adapted to be securely attached to said underside of said main frame of said excavator;
      a lifting mechanism:
         wherein said lifting mechanism is attached to said frame attachment plate; and
      a turntable assembly;
wherein said turntable assembly is attached to said lifting mechanism opposite from said frame attachment plate;
         wherein said turntable assembly is adapted to engage said ground surface and allow rotation of said frame attachment plate and said lifting mechanism with respect thereto;
      wherein said lifting mechanism is adapted to move said turntable assembly downwards and upwards with respect to said frame attachment plate; and wherein when in use, said boom of said excavator is lowered such that said bucket engages said ground surface, then said turntable assembly is moved downwards and contacts said ground surface and pushes said frame attachment plate upwards from said ground surface, which raises said excavator main frame and said pair of tracks above said ground surface, then when said excavator main frame and said pair of tracks are above said ground surface, and while said bucket is engaged with said ground surface, said rotary motor of said excavator is used to rotate said main frame and said pair of tracks, and said frame attachment plate and said lifting mecha- nism, via said turntable assembly and relative to said ground surface, to a desired position with respect to said ground surface, then when said turntable assem- bly is moved upwards and disengages from said ground surface said main frame, said pair of tracks, and said frame attachment plate are allowed to move downwards toward said ground surface which lowers said excavator and said pair of tracks back upon said ground surface, then said boom is raised and the bucket disengaged from said ground surface such that said excavator is ready for use.

7. The combination of claim 6, wherein said lifting mechanism comprises:
   a linkage assembly including:
      two linkages;
         wherein said two linkages are parallel and spaced from one another;
      wherein said linkage assembly is pivotally connected to said frame attachment plate and pivotally connected to said turntable assembly; and
   a hydraulic assembly including:
      a hydraulic controller;
         wherein said hydraulic controller is adapted to be attached within said cabin of said excavator;
      a hydraulic piston;
         wherein said hydraulic piston is pivotally connected to said frame attachment plate and pivotally con- nected to said turntable assembly; and
      two hydraulic hoses;
         wherein said two hydraulic hoses are respectively connected between said hydraulic controller and said hydraulic piston;
      wherein said hydraulic assembly is used to move said turntable assembly downwards and upwards.

8. The combination of claim 7, wherein said turntable assembly comprises:
   a base plate including:
      a bottom plate portion; and
      an encapsulating ring;
         wherein said encapsulating ring is attached to a top surface of said bottom plate portion; and
   a circular plate;
      wherein said circular plate is sized and shaped and adapted to be held by said encapsulating ring between said bottom plate portion and said encap- sulating ring, such that said circular plate can rotate freely therebetween; and
   wherein said hydraulic piston is attached to said circular plate of said turntable assembly, and said two linkages are attached to said circular plate of said turntable assembly.

9. The combination of claim 8, wherein said turntable assembly further comprises a lubricant between said bottom plate portion and said circular plate.

10. The combination of claim 8, wherein said attachment between said hydraulic piston and said circular plate is between said attachment of said two linkages to said circular plate; and wherein said attachment of said hydraulic piston to said frame attachment plate is spaced from said attach- ment of said two linkages to said frame attachment plate, such that said apparatus for lifting and rotating said exca- vator is adapted to stably lift and rotate said excavator above said ground surface.

11. The combination of claim 10, wherein a stabilizing pivot foot is used to pivotally attach said hydraulic piston to said circular plate of said turntable assembly; wherein two stabilizing pivot feet are used to respectively pivotally attach said two linkages to said circular plate of said turntable assembly; wherein said stabilizer pivot foot of said hydraulic piston is between and linearly aligned with said stabilizing pivot feet of said two linkages; and wherein an elongated pivot pin is placed simultaneously through said stabilizing pivot feet of said two linkages, said two linkages, said stabilizer pivot foot of said hydraulic piston, and said hydraulic piston, and is adapted and used to increase the stability of said apparatus for lifting and rotating said excavator while in use.

\* \* \* \* \*